July 22, 1924.
C. J. McNERNY
1,502,580
PRESSURE BRAKE FOR AUTOS
Filed Feb. 28, 1920    2 Sheets-Sheet 2
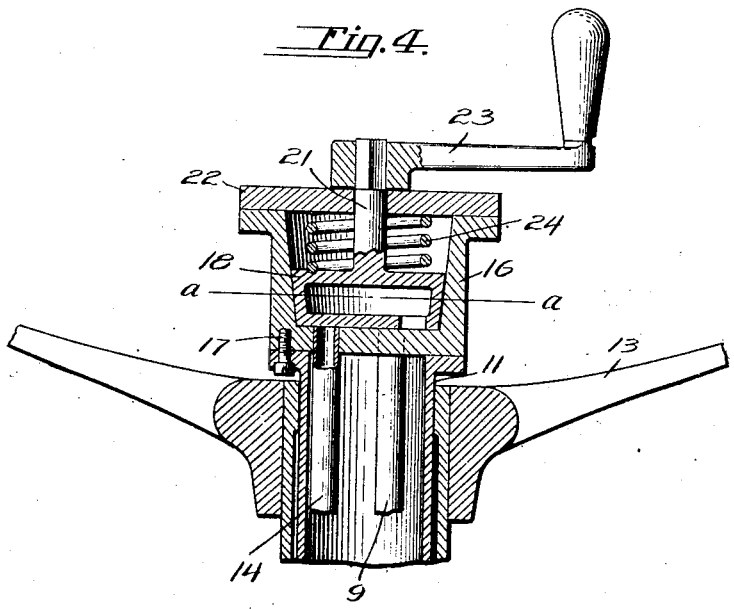
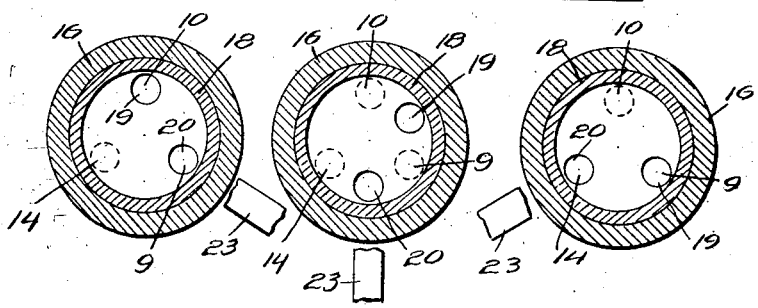
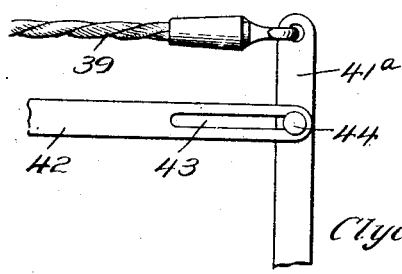
Inventor
Clyde J. McNerny,
By Geo. P. Kimmel
Attorney Patented July 22, 1924.

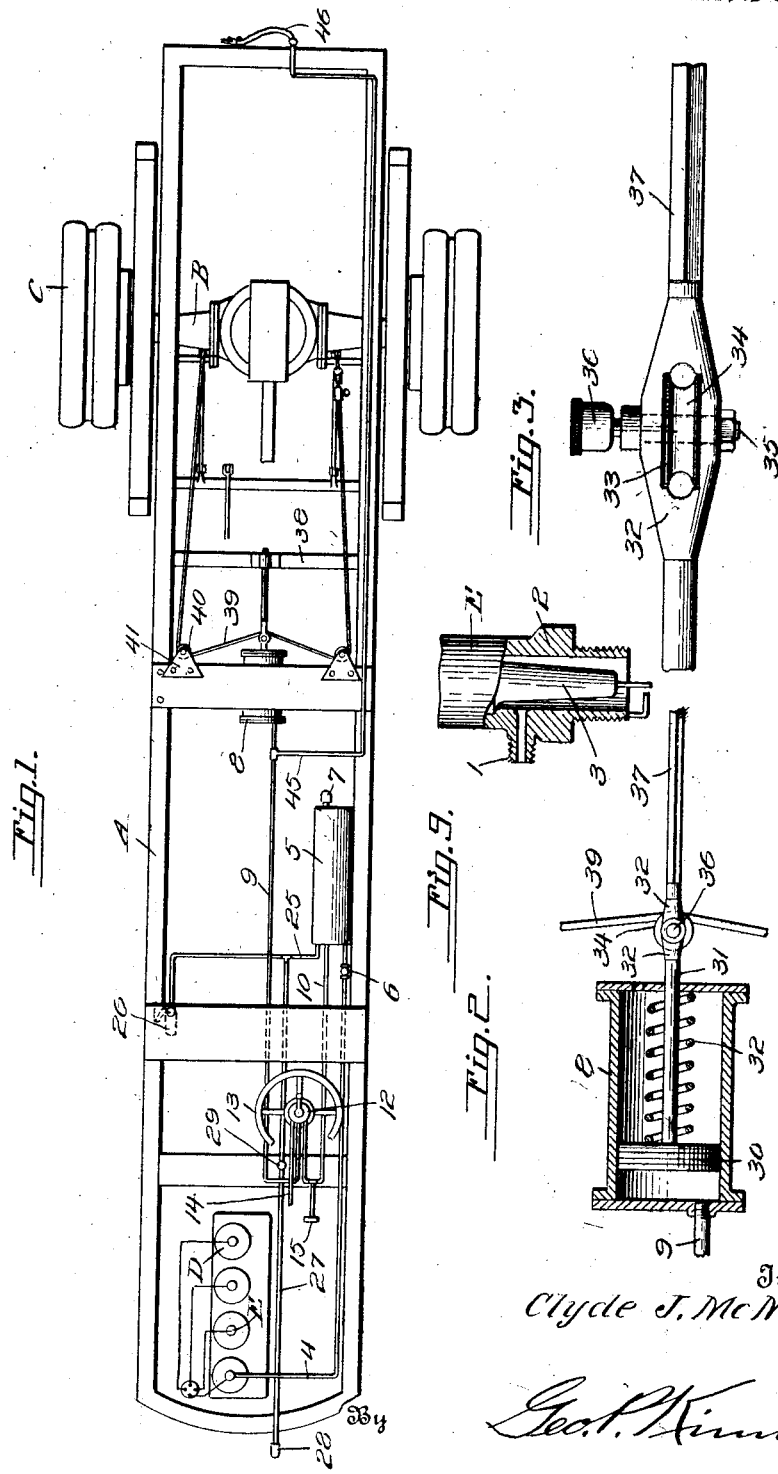

1,502,580

UNITED STATES PATENT OFFICE.

CLYDE J. McNERNY, OF SAN FRANCISCO, CALIFORNIA.

PRESSURE BRAKE FOR AUTOS.

Application filed February 28, 1920. Serial No. 362,041.

*To all whom it may concern:*

Be it known that I, CLYDE J. McNERNY, a citizen of the United States, residing at San Francisco, in the county of San Francisco and State of California, have invented certain new and useful Improvements in a Pressure Brake for Autos, of which the following is a specification.

This invention relates generally to improvements in brake and signal apparatus for vehicles.

The principal object of the invention is to utilize a portion of the products of combustion of one or more of the cylinders of an internal combustion engine to operate the brake and signal apparatus and to this end connection is effected from the engine cylinder (in case one cylinder is used) to a compression tank or reservoir through the spark plug in order that a portion of the exhaust products will be transferred to the compression tank upon explosion of the combustible charge.

Another object of the invention is to adapt the brake operating mechanism for use with the usual foot pedal whereby the service brake of common design may be used if desired without interfering with the operation of the present brake which in such a case would serve as an improved emergency brake.

Other objects of the invention are, first, to effect a connection between the vehicle and one or more trailers in order that the brakes of the vehicle and trailers may be applied simultaneously; second, to construct the operating mechanism so that connection may be severed, between the engine cylinder or cylinders and compression tank or reservoir when the pressure in the tank is sufficiently high in order to re-instate full compression in the cylinders; and third, to construct the present brake so that it may be used in a vehicle of conventional design as an auxiliary to the usual form of brake and signal devices.

With these objects in view and others as will appear as the nature of the invention is better understood, the invention comprises the various novel features of construction and arrangement of parts, which will be more fully described hereinafter and set forth with particularity in the claims appended hereto.

In the drawings.

Fig. 1 is a plan view of the chassis of a vehicle with the present brake and signal apparatus applied.

Fig. 2 is a detail view of the brake cylinder, pistons and peculiar piston rod construction.

Fig. 3 is an enlarged detail of a portion of the piston rod.

Fig. 4 is a sectional view of the valve control.

Figures 5, 6, and 7 are plan views of the valve control, on the line $a$—$a$ of Fig. 4, showing the same in position respectively to, open communication between the reservoir or tank and the brake cylinder, to sever communication between all operating parts, and to exhaust the air from the brake cylinder to release the brakes.

Fig. 8 is a detail of the connection between the foot pedal and the present brake with the service brake operating lever and, Fig. 9 is a detail view of the manner of connecting the compression reservoir or tank with the engine cylinder through the spark plug.

Like characters of reference refer to like or similar parts throughout the several views, in which, A conventional type of automobile or truck has a chassis A, a rear axle with the usual casing B, rear wheels C and an engine D provided with spark plugs E, one of which is formed with a nipple 1 communicating with the interior of the spark plug housing 2 between the walls thereof and the insulator 3. A small conduit 4, one end of which is connected with the nipple 1 has its other end connected with the compression tank or reservoir 5 to deliver thereto a portion of the products of combustion from the engine cylinder upon explosion of the combustible charge. Although in the present embodiment of the invention connection with only one spark plug is shown, more than one, or all of the spark plugs may be used depending on the size of the compression tank or reservoir and upon the quantity of products of combustion necessary to attain the desired compression. Furthermore instead of using the spark plugs to effect connection between the engine cylinders and compression tank or reservoir the pet-cocks (not shown) of the engine may be utilized and this may be found desirable when spark plugs of the present type are not available. A ball check-valve 6 is provided in the conduit 4 for an obvious purpose, and a relief valve 7 is connected with the reservoir 5 for preventing excessive pressure in the tank.

A brake cylinder 8 communicates with the compression tank or reservoir 5 through conduits 9 and 10 extending upwardly through the steering gear tubing 11 and communicating one with the other through a control valve generally designated by 12 mounted on the steering gear tubing above the steering wheel 13 and connected with an exhaust pipe 14. The control valve being a three way valve hereinafter described with particular reference to Figures 4, 5, 6 and 7. On an extension of the pipe 10 is mounted a pressure gage 15 visible from the driver's seat for an obvious purpose.

The control valve generally designated by 12 comprises a housing 16 secured as at 17 to the flanged end of the steering gear tubing 11, and has openings in the bottom wall thereof within which are received the conduits 9 and 10 and the exhaust pipe 14—these openings being preferably arranged with their centers coincident with the three corners of a triangle. Seated within the housing is a hollow valve 18 having openings 19 and 20 communicating with the interior thereof for registration with the open ends of the conduits 9 and 10 when in the position illustrated in Fig. 6 to permit passage of the products of combustion to the brake cylinder 8 from the compression tank 5 to set the brakes and for registration with the open ends of the conduit 9 and exhaust pipe 14 when in the position illustrated in Fig. 7 to permit passage of the products of combustion from the brake cylinder 8 to the exhaust pipe 14 to release the brakes. The neutral position is shown in Fig. 5 when the openings 19 and 20 do not register with either the conduits or the exhaust pipe. The shank 21 of the valve 18 extends upwardly through the cover 22 of the housing and has a squared end for receiving an operating handle 23. A coil spring 24 about the shank 21 abuts the cover 22 and the upper wall of the valve 18 to hold the valve securely upon its seat.

A conduit 25 communicates with the compression tank 5 and is bent to extend upwardly above the top or cab of the vehicle to receive a whistle 26 operable through the medium of a cord from a trailer (neither of which are shown) to establish communication between the driver of the vehicle and the occupants of the trailer, and a branch pipe 27 extends to the forward end of the chassis and is provided with a whistle or siren 28 for an obvious purpose; a foot operated valve 29 being provided adjacent the driver for operating the same when so desired.

The brake mechanism for the vehicle per se comprises the double headed brake cylinder 8 communicating with the compression tank or reservoir 5 through the conduits 9 and 10, and has mounted therein a piston 30 having the usual piston rod 31 about which extends a coil spring 32 for normally holding the piston in an inoperative position. The piston rod 31 is enlarged intermediate its extremities as at 32, and an elongated opening 33 is provided within the enlargement for receiving a pulley 34 mounted on a pin 35 provided with a grease cup 36. The free end of the piston rod 31 is squared as at 37 and is slidably mounted in a squared opening in a transverse supporting bar 38 to prevent revolving or turning of the piston 30 and to support the piston rod. A rope 39 (preferably of steel wire) extends through the pulley 34 and is trained about pulleys 40 in brackets 41 mounted in one of the transverse chassis supports, the free ends of the rope 39 engage the brake levers 41$^a$ pivoted to collars on the axle casing B (see Fig. 8) to which are also secured the operating rods 42 of the foot brake, elongated slots 43 being provided therein within which are carried pins 44 on the levers 41$^a$ so that upon movement of the brake levers 41$^a$ by the fluid pressure braking device the foot brake will not be actuated.

From the foregoing it will be seen that upon opening communication between conduits 9 and 10 by the control valve 11 that the piston 30 will be forced back against the tension of the coil spring 32 and the rope 39 will be forced outwardly thus moving the brake levers 41$^a$ to throw in the brakes, and upon release of the compression in the brake cylinder 8 by turning the control valve 11 to open communication between the conduit 9 and exhaust pipe 14 the piston will be pressed by the spring 32 to return to its normal position, thus slacking the rope 39 and releasing the brakes.

A conduit or pipe line 45 communicates with the conduit 9 and extends to the rear of the chassis and is provided with a flexible coupling 46 for connection with the brake mechanism of a trailer (not shown) so that the brakes on the trailer will be operated simultaneously with the brake on the primary vehicle.

From the foregoing description taken in connection with the accompanying drawings, it is thought that a clear and comprehensive understanding of the construction, operating, and advantages of the invention may be had, but while I have shown and described the device as embodying a specific structure, I desire it to be understood that such changes may be made in said structure, as do not depart from the spirit and scope of the invention as claimed.

What is claimed is:

1. In an apparatus of the class described a tubular support, a valve casing attached to said support over one end, a plurality of conductors extending through said support and communicating respectively with said valve casing, one of said conductors adapted to be connected to a source of supply of liquid under pressure, another of said conductors adapted to be connected to an operating mechanism, and another of said conductors leading to the open air, a hollow valve within said casing and having spaced ports adapted to register alternately with said conductors, and means for actuating said valve.

2. In an apparatus of the class described a cylindrical valve casing, a plurality of tubular conductors communicating with said valve casing through one end, a hollow valve having spaced ports in one end adapted to alternately register with said conductors, and means for actuating said valve.

In testimony whereof, I hereunto affix my signature.

CLYDE J. McNERNEY.